United States Patent
Hsiao et al.

(10) Patent No.: US 7,457,972 B2
(45) Date of Patent: Nov. 25, 2008

(54) SOUTH AND NORTH BRIDGE AND RELATED COMPUTER SYSTEM FOR SUPPORTING CPU

(75) Inventors: Ya-Hsin Hsiao, Taipei Hsien (TW); Chungwey Lin, Taipei Hsien (TW); Aaron Hsieh, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 408 days.

(21) Appl. No.: 11/275,633

(22) Filed: Jan. 20, 2006
(Under 37 CFR 1.47)

(65) Prior Publication Data
US 2006/0168460 A1    Jul. 27, 2006

(30) Foreign Application Priority Data
Jan. 21, 2005    (TW) ............................ 94101883 A

(51) Int. Cl.
*G06F 1/00*    (2006.01)
*G06F 1/26*    (2006.01)
*G06F 1/32*    (2006.01)

(52) U.S. Cl. .................. 713/300; 713/320; 713/323
(58) Field of Classification Search ................ 713/300, 713/320, 323
See application file for complete search history.

(56) References Cited

U.S. PATENT DOCUMENTS

| | | | |
|---|---|---|---|
| 6,288,729 B1 * | 9/2001 | Laksono et al. | 345/520 |
| 6,677,954 B1 * | 1/2004 | Jensen et al. | 345/531 |
| 6,897,874 B1 * | 5/2005 | Riach | 345/558 |
| 7,205,957 B2 * | 4/2007 | Shiuan et al. | 345/1.1 |
| 7,245,272 B2 * | 7/2007 | Shiuan et al. | 345/2.2 |

* cited by examiner

*Primary Examiner*—Chun Cao
*Assistant Examiner*—Ji H Bae
(74) *Attorney, Agent, or Firm*—Winston Hsu

(57) ABSTRACT

A circuit, designed for supporting a computer system having a CPU, a monitor, and a system memory electrically connected to the CPU, includes a south bridge, and a north bridge electrically connected to the south bridge, the CPU, and the monitor. The north bridge includes a state machine and a graphics data buffer. When detecting that graphics data transferred by the graphics data buffer to the monitor is insufficient, the state machine sends a north bridge signal to the CPU to access inner data of the system memory.

13 Claims, 5 Drawing Sheets

| | GFX | Assert/De-assert | LDTSTOP_SB# | LDTSTOP_NB(t-1)# | LDTSTOP_NB(t)# |
|---|---|---|---|---|---|
| L1 | 0 | 0 | 0 | 0 | 0 |
| L2 | 0 | 0 | 0 | 1 | 1 |
| L3 | 0 | 0 | 1 | 0 | 0 |
| L4 | 0 | 0 | 1 | 1 | 1 |
| L5 | 0 | 1 | 0 | 0 | 0 |
| L6 | 0 | 1 | 0 | 1 | 0 |
| L7 | 0 | 1 | 1 | 0 | 1 |
| L8 | 1 | 0 | 0 | 0 | 0 |
| L9 | 1 | 0 | 0 | 1 | 1 |
| L10 | 1 | 0 | 1 | 0 | 0 |
| L11 | 1 | 0 | 1 | 1 | 1 |
| L12 | 1 | 1 | 0 | 0 | 1 |
| L13 | 1 | 1 | 0 | 1 | 1 |
| L14 | 1 | 1 | 1 | 0 | 1 |
| L15 | 1 | 1 | 1 | 0 | 1 |
| L16 | 1 | 1 | 1 | 1 | 1 |

Fig. 5

SOUTH AND NORTH BRIDGE AND RELATED COMPUTER SYSTEM FOR SUPPORTING CPU

BACKGROUND OF THE INVENTION

1. Field of the Invention

The present invention relates to a chipset, and more particularly, to a method for supporting a monitor to display with a chipset and related computer system.

2. Description of the Prior Art

Please refer to FIG. 1, which is a functional block diagram of a computer system 40 having a K8 CPU 42 produced by AMD according to the prior art. The computer system 40 further includes a chipset composed of a north bridge 44 and a south bridge 46, a system memory 18 couples to the CPU 42 directly, a monitor 22 coupled to the north bridge 44 for displaying graphics data, and some peripheral devices, such as a keyboard 24 and a hard disk 26, coupled to the south bridge 46.

When the CPU 42 processes high speed data logic operations, the CPU 42 is operated in high operating state, such as a power saving state C0. However, when the CPU 42 doesn't process high speed data logic operations, the CPU 42 is operated in power saving states, such C1, C2 or C3, to reduce power consumption.

When operating in the power saving state C0, the CPU 42 is at full speed and capable of receiving and executing instructions.

When operating in the power saving state C1, the CPU 42 stops receiving instructions to save power consumption.

When operating in the power saving state C2, the CPU 42 further stops outputting clocks.

When operating in the power saving state C3, the CPU 42 is unable to support a snoop operation.

When the CPU 42 doesn't operate at full speed, the CPU 42 is switched from the power saving state C0 to the power saving state C3. When switching CPU Power states, the operating system sends an STPCLK signal through the south bridge 46 to the CPU 42. After the CPU 42 is ready to be switched, the south bridge 46 sends an asserted LDTSTOP# ('#' means low voltage enabled) signal to the north bridge 44 and CPU 42. Then the CPU 42 enters the power saving state C3, and the north bridge 44 disconnects to the CPU 42. As a result, the snoop operation cannot be performed between the north bridge 44 and the CPU 42.

When the south bridge 46 receives a bus master signal or an interrupt, power states of the CPU 42 has to be switched from a deeper power saving state (for example C3) to a shallower power saving state (for example C2 to C0). Thus the south bridge 46 sends de-asserted LDTSTOP# signal to the north bridge 44 and CPU 42 for entering the CPU 42 into a shallower power saving state and reconnecting the north bridge 44 and the CPU 42. Therefore, the bus master signal and the interrupt can function normally.

Since the monitor 22 has to display graphics data continuously and the data must be access form the system memory 18 through the CPU 42. When the south bridge 46 sends the asserted LDTSTOP# signal to disconnect the north bridge 44 and the CPU 42, whether the graphics data stored in a buffer of the north bridge 44 is sufficient is not controllable. Therefore, if the graphics data stored in the buffer is not sufficient, the CPU 42 has to be switched to operate in a shallower power saving state, and then more graphics data can be acquired from the system memory 18. If the time it takes for the CPU 42 to be switched to operate from the power saving state C3 to the power state C0 is long, and the CPU 42 cannot acquire enough graphics data in time, the monitor 22 encounters a display interruption problem.

Taking the example of switching power state from a deeper power saving state to the power saving state C0, when the north bridge 44 determines that the graphics data stored in the buffer is not sufficient for the monitor 22 to display, the north bridge 44 sends an AGP BUSY signal to the south bridge 46. Then, the south bridge 46 sends the de-asserted LDTSTOP# to the north bridge 44 and the CPU 42 for switching the CPU 42 to a shallower power saving state and reconnecting the north bridge 44 and the CPU 42, and then performing graphics data access from the system memory 18.

However the time consumption of the above mention steps, from sending signals to completing confirmation, is longer than that the time for the buffer in the north bridge 44 to output graphics data. This problem is more serious especially in a graphic integrated chipset due to the complicated inner circuit without having enough space for data storage.

SUMMARY OF THE INVENTION

The invention provides a chipset for overcoming the above-mentioned problems.

If the north bridge have insufficient graphics data in the buffer, the chipset can still access graphics data stored in the system memory without switching the power saving state of the CPU.

The chipset includes a south bridge, a north bridge coupled to the south bridge, a CPU and a monitor of a computer system. The CPU has at least a deep power saving state and at least a shallow power saving state. The computer system further includes a system memory. The north bridge has a state machine coupled to the CPU, and a graphics data buffer coupled to the state machine and the monitor, wherein when the CPU is in the deep power saving state and the state machine detects that graphics data transferred from the graphics data buffer to the monitor is insufficient, the state machine sends an NB control signal to the CPU to access inner data stored in the system memory.

A computer system includes: a system memory for storing an inner data; a CPU couples to the system memory, wherein the CPU having at least a shallow power saving state and a deep power saving state; a monitor; and a chipset couples to the CPU and the monitor. When the CPU is in the deep power saving state, if the graphics data stored in chipset is insufficient, the chipset sends an NB control signal to the CPU to access inner data stored in the system memory.

A method supports a monitor of a computer system with a chipset. The computer system has a CPU and a system memory coupled to the CPU, the CPU having at least a shallow power saving state and a deep power saving state. The method includes: sending an NB control signal to the CPU when the CPU is in the deep power saving state and graphics data transferred to the monitor is insufficient, and the CPU switching to access inner data stored in the system memory to provide the graphics data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a truth table of signals shown in FIG. 4.

DETAILED DESCRIPTION

Figure 1:
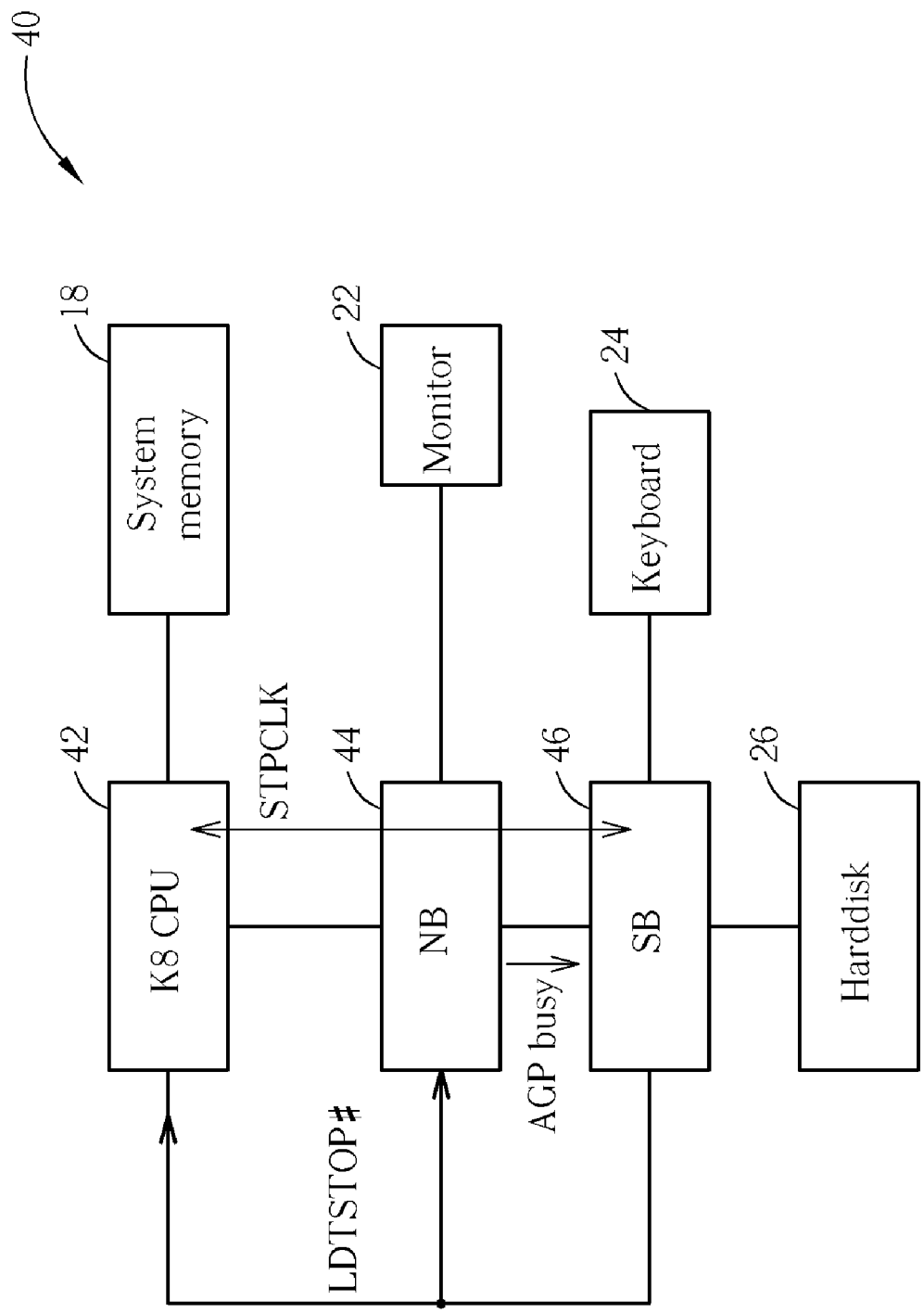
FIG. 1 is a functional block diagram of a computer system having a K8 CPU produced by AMD according to the prior art.
Figure 2:
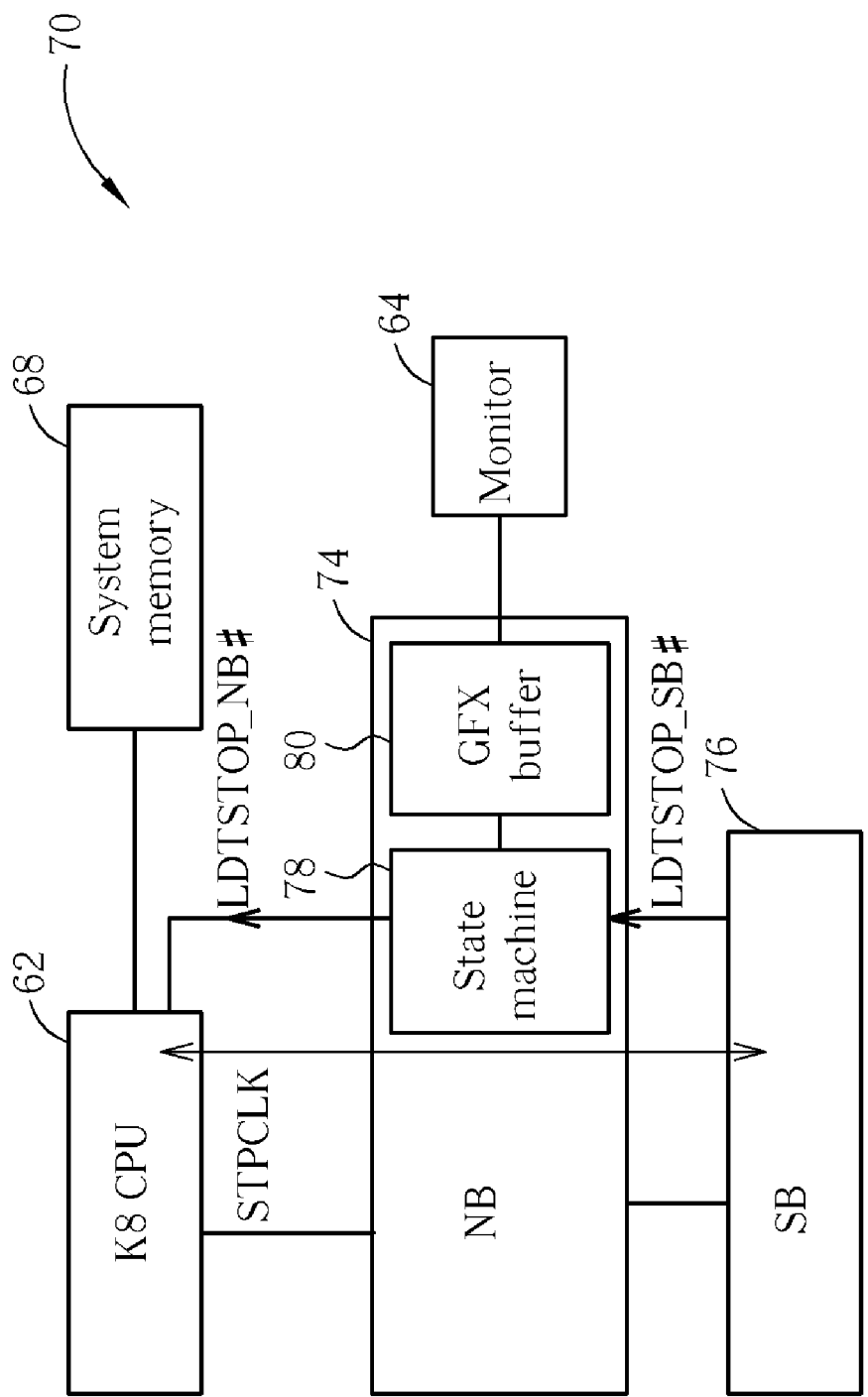
FIG. 2 is a functional block diagram of a computer system having a K8 CPU of the preferred embodiment according to the present invention.

Please refer to FIG. 2, which is a functional block diagram of a computer system 70 having a K8 CPU 62 produced by AMD of the preferred embodiment according to the present invention.

The computer system 70 further includes a chipset having a south bridge 76 and a north bridge 74, a system memory 68 coupled to the CPU 62 directly, and a monitor 64 couples to the north bridge 74 for displaying graphics data. The north bridge 74 has a state machine 78 and a graphics data (GFX) buffer 80.

Since only the north bridge 74 knows whether or not the monitor 64 has sufficient graphics data to display, the present invention provides a state machine 78 within the north bridge 74 to monitor the graphics data stored in the GFX buffer 80. By using an NB control signal (which will be called LDTSTOP_NB# hereafter) sent from the state machine 78 to the CPU 62, the CPU 62 can only enable an embedded memory controller without enabling the logic operation Therefore the north bridge 74 can still access the graphics data stored in the system memory 68 directly even if the CPU 62 still stays in the original power saving state.

Figure 3:
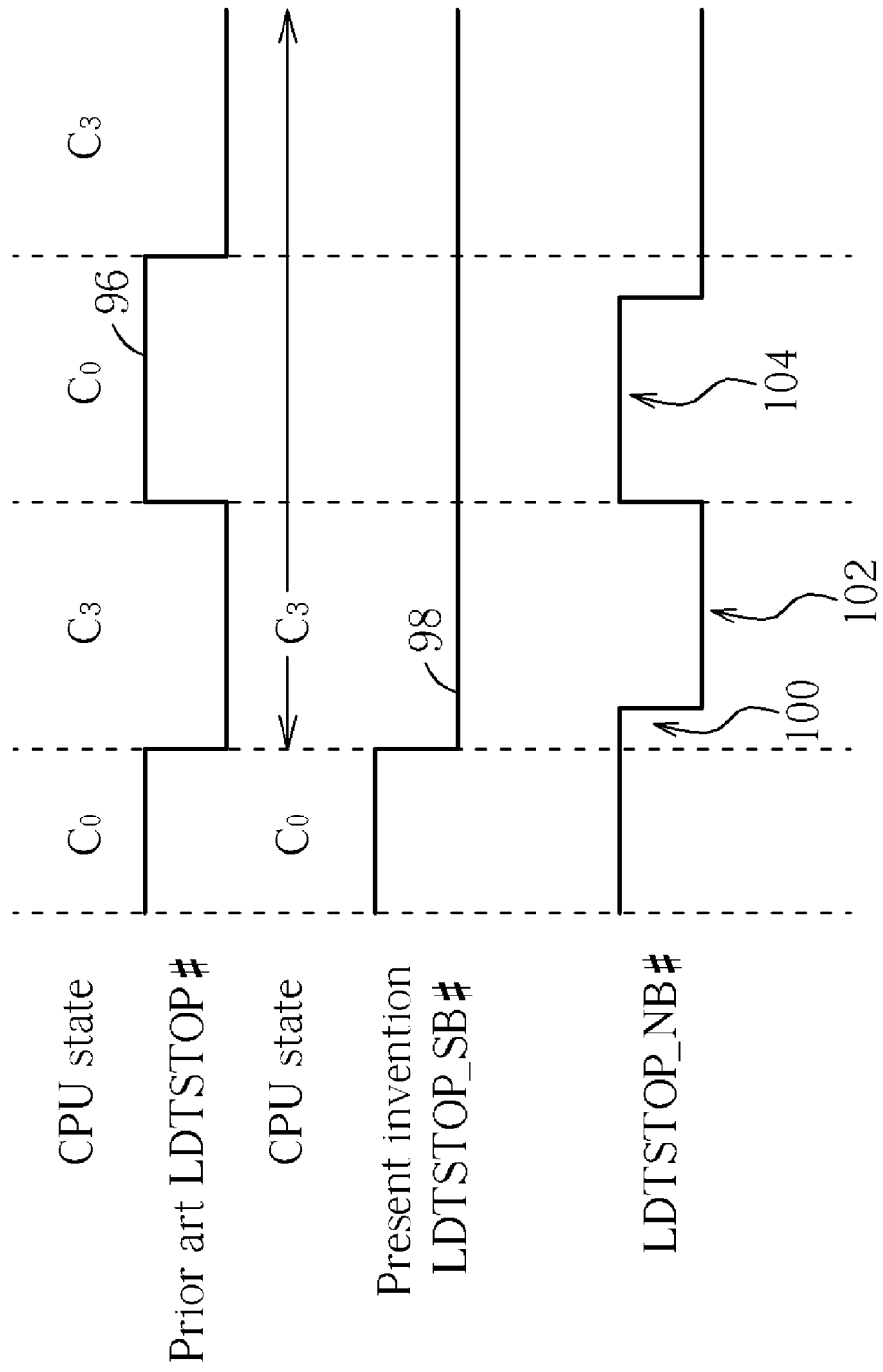
FIG. 3 is a waveform diagram of inner control signals for switching a shallow power saving state into a deep power saving state of the prior art and the present invention.

FIG. 3 is a timing diagram of switching the power state from a shallower power saving state to a deeper power saving state of the prior art and the present invention.

When the south bridge 76 receives an asserted signal from the CPU 62, the CPU 62 is switched from C0 to C3. Then an LDTSTOP_SB# signal, similar to the asserted LDTSTOP# signal, is transmitted to the north bridge 74, as shown in region 98 shown in FIG. 3. After receiving the LDTSTOP_SB#, the north bridge 74 checks a data display status of the monitor 64, and then sends an asserted LDTSTOP_NB# signal to the CPU 62 to disconnect the north bridge 74 and the CPU 62 only when data (which will be acquired by an internal GFX during 100 shown in FIG. 3) stored in the GFX buffer 80 is still sufficient for the monitor 64 to display. Since the north bridge 74 transfers data to the GFX buffer 80 by down counting method, the problem resulting from a system slowly switching power saving states and having insufficient data to display will not occur.

Moreover, if the CPU 62 is operated in a deeper power saving state (ex. C3), if the graphics data stored in the GFX buffer 80 is not enough for the monitor 64 to display, the state machine 78 in the north bridge 74 sends a de-asserted LDTSTOP_NB# signal, which is a non-snoop signal and is shown in FIG. 3 in region 104, to control the memory controller of the CPU 62 to switch to the function of accessing the system memory 68 without changing the LDTSTOP_SB# asserted state. Therefore, the power saving state of the CPU 62 doesn't change, and the data stored in the system memory 68 can be accessed to provide for the GFX buffer 80 during region 104 shown in FIG. 3. Comparing to a region 96 of the LDTSTOP# signal shown in FIG. 3 which shows that the prior art cannot access the system memory 68 without generating a de-asserted LDTSTOP# and switching the CPU 62 to the shallower power saving state C0. Therefore the present invention is faster and saves more power.

Figure 4:
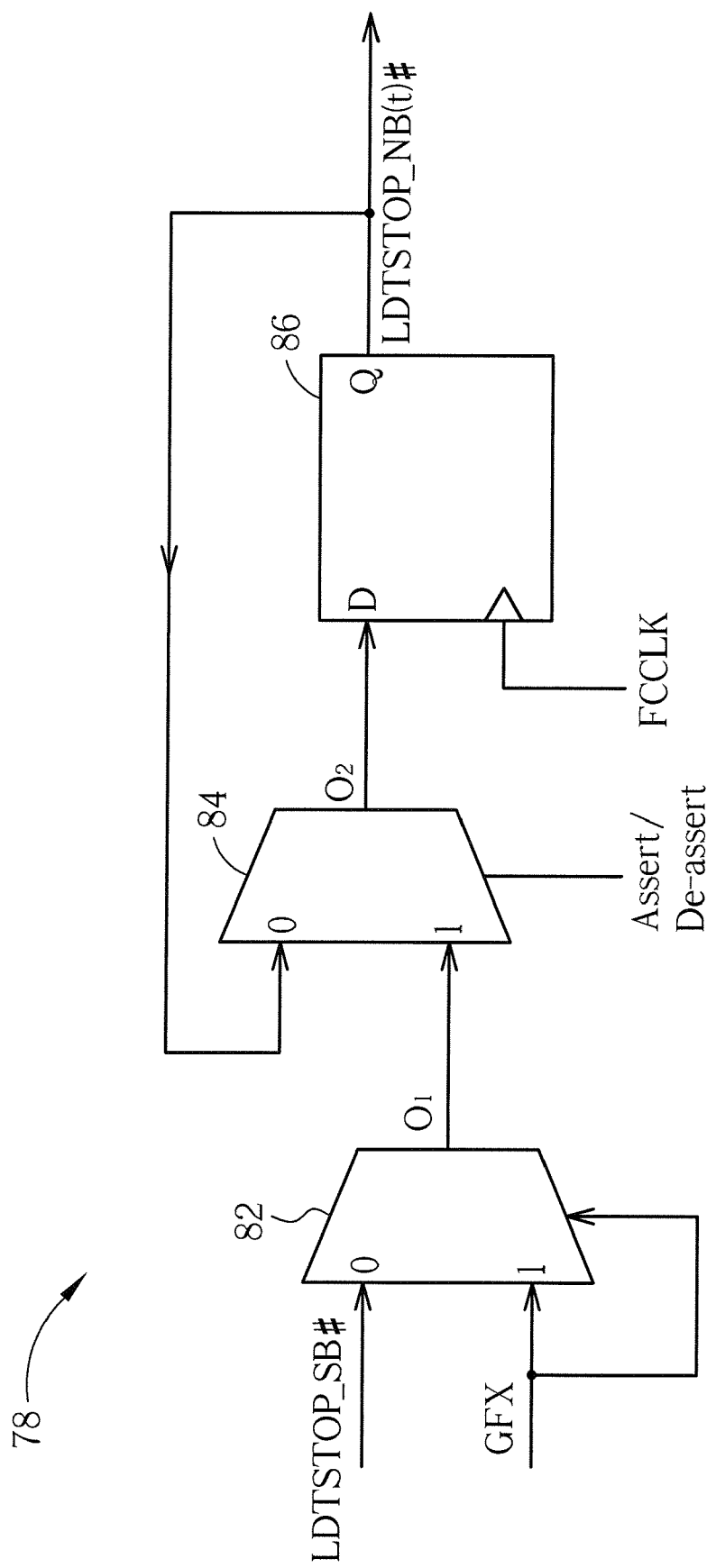
FIG. 4 is a circuit diagram of a state machine of the computer system shown in FIG. 2.

Please refer to FIG. 4, which is a circuit diagram of the state machine 78.

The state machine 78 includes a first multiplexer 82, a second multiplexer 84, and a D-type flip-flop 86. The first multiplexer 82 transfers either the LDTSTOP_SB# or a state signal GFX from the GFX buffer 80 to the second multiplexer 84 according to the state signal GFX.

For example, if the state of the state signal GFX is "0" (representing that the data stored in the GFX buffer 80 are enough for the monitor 64 to display), the first multiplexer 82 selects the LDTSTOP_SB# outputting to the second multiplexer 84. On the contrary, if the data stored in the GFX buffer 80 are not sufficient (the state signal GFX is "1"), the first multiplexer 82 selects the state signal GFX (labeled as "1" in FIG. 4) outputting to the second multiplexer 84 for enabling the LDTSTOP_NB(t)# signal, which is outputted from the D-type flip-flop 86, to be "1" as shown in FIG. 3 as region 100. When the data stored in the GFX buffer 80 is sufficient, the state of the state signal GFX is "0", and the first multiplexer 82 outputs the LDTSTOP_SB# signal for enabling the LDTSTOP_NB(t)# signal to be "0", as shown in FIG. 3 as region 102.

The second multiplexer 84 is controlled by a down counter (not shown in FIG. 3, the down counter can be integrated into the state machine 78) of the north bridge 74. When the down counter is not yet counting to zero, an assert/de-assert signal is used to control an input end, which has an output equals to "0", for outputting an NB−1 control signal. The NB−1 control signal is generated according to feedback of LDTSTOP_NB(t)# from an output end Q of the D-type flip-flop 86 and is inputted to the input end D of the D-type flip-flop 86 via the second multiplexer 84. Thus, if the down counter is not yet counting to zero, state of LDTSTOP_NB(t)# will keep at the state of the previous LDTSTOP_NB(t)# (called an LDTSTOP NB(t−1)# hereafter), thus the switching is performed after a predetermined period of time.

As shown in FIG. 3, the interval between 102 and 104 is not less than a predetermined period (for example one microsecond). During the predetermined period, the north bridge 74 will not change LDTSTOP_NB#, which is transferred to the CPU 62. On the contrary, when the down counter is counting to zero, the second multiplexer 84 using an assert/de-assert signal to control the input end, which has the output equals to "1", for outputting LDTSTOP_SB# from an output end $O_1$ of the first multiplexer 82 or the state signal GFX of the GFX buffer 80 to the input end D of the D-type flip-flop 86.

The operation of the state machine 78 for generating the LDTSTOP_NB(t) is described as follows.

Please refer to FIG. 5, which is a truth table of the state signal GFX, the assert/de-assert signal, LDTSTOP_SB#, LDTSTOP_NB(t−1)# and LDTSTOP_NB(t)#. When the down counter is not yet counting to zero (the assert/de-assert is "0"), the duration of the LDTSTOP_NB(t)# is less than one microsecond (or less than a programmable shortest period). The computer system 70 does not allow LDTSTOP_NB(t)#, from the north bridge 74 to the CPU 62, to switch, so the state of LDTSTOP_NB(t)# is keeps to the state of LDTSTOP_NB(t−1)# (as L1-L4 and L9-L12 in the table show).

When the down counter is counting to zero (the assert/de-assert shown in FIG. 5 is "1"), if the state signal GFX is equal to "0" (the first multiplexer 82 shown in FIG. 4 transfers LDTSTOP_SB# to the second multiplexer 84), the north bridge 74 generates succeeding LDTSTOP_NB(t)# according to LDTSTOP_SB#, as L5-L8 in the table shows, without taking into consideration the state of LDTSTOP_NB(t−1).

When the down counter is counting to zero, and the state of state signal GFX is equal to "1" (the first multiplexer 82 outputs the state signal GFX, which state is equal to "1", to the second multiplexer 84), the following generating LDT-STOP_ NB(t) of the north bridge 74 is generated to ensure the north bridge 74 still can accessing the system memory 68. So that, the internal GFX can access data ready to be displayed on the monitor 64 from the system memory 68 through the CPU 62 and the north bridge 74. In FIG. 5, this is shown as LDTSTOP_NB(t) values equal to "1" in L12-L16.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A chipset for a computer system having a CPU, a monitor, and a system memory coupled to the CPU, the CPU comprising at least a memory controller controlling access to the system memory, a deep power saving state and at least a shallow power saving state, the chipset comprising:
    a south bridge; and
    a north bridge coupled to the south bridge, the CPU, and the monitor, the north bridge comprising:
        a state machine coupled to the CPU; and
        a graphics data buffer coupled to the state machine and the monitor,
    wherein when the CPU is in the deep power saving state and the state machine detects that graphics data stored in the graphics data buffer is insufficient, the state machine sends an NB control signal to the memory controller of the CPU to access data stored in the system memory without changing the deep power saving state of the CPU, and wherein the state machine comprises:
    a first multiplexer for selectively outputting either a state signal of the graphics data buffer or an SB control signal according to the state signal;
    a second multiplexer for selectively outputting either what the first multiplexer outputs or an NB−1 control signal according to a counting control signal output from a down counter; and
    a flip-flop having an input end coupled to an output end of the second multiplexer for outputting the NB control signal based on a control clock, the NB control signal traveling to an input end of the second multiplexer to become the NB−1 control signal.

2. The chipset of claim 1, wherein the flip-flop is a D-type flip-flop.

3. The chipset of claim 1, wherein when the graphics data is insufficient, a logic level of the state signal output from the graphics data buffer is changed to enable the state machine to control the NB control signal.

4. The chipset of claim 1, wherein the down counter does not output the counting control signal to the second multiplexer until an index of the down counter is equal to a predetermined number.

5. The chipset of claim 4, wherein the predetermined number is equal to zero.

6. A computer system comprising:
    a system memory for storing an inner data;
    a CPU coupled to the system memory, the CPU comprising at least a memory controller controlling access to the system memory, a shallow power saving state and a deep power saving state;
    a monitor; and
    a chipset coupled to the CPU and the monitor,
    wherein when the CPU is in the deep power saving state and the chipset stores insufficient graphics data, the chipset sends an NB control signal to the memory controller of the CPU to access inner data stored in the system memory without changing the deep power saving state of the CPU, and wherein the chipset comprises:
    a first multiplexer for selectively outputting either a state signal of a graphics data buffer or an SB control signal output from a south bridge according to the state signal;
    a second multiplexer for selectively outputting either what the first multiplexer outputs or an NB−1 control signal according to a counting control signal of a down counter; and
    a flip-flop having an input end coupled to an output end of the second multiplexer for outputting the NB control signal based on a control clock, the NB control signal traveling to an input end of the second multiplexer to become the NB−1 control signal.

7. The computer system of claim 6, wherein the flip-flop is a D-type flip-flop.

8. The computer system of claim 6, wherein when the graphics data is insufficient, a logic level of the state signal output from the graphics data buffer is changed to enable a state machine to control the NB control signal.

9. The computer system of claim 6, wherein the down counter does not output the counting control signal to the second multiplexer until an index of the down counter is equal to a predetermined number.

10. The computer system of claim 6, wherein the predetermined number is equal to zero.

11. A method for supporting a monitor of a computer system with a chipset, the computer system comprising a CPU and a system memory coupled to the CPU, the CPU comprising at least a memory controller controlling access to the system memory, a shallow power saving state and a deep power saving state, the method comprising:
    when the CPU is in the deep power saving state and graphics data in a graphics data buffer is insufficient, sending an NB control signal to the memory controller of the CPU; and
    the memory controller of the CPU switching to access inner data stored in the system memory to provide the graphics data without the CPU changing the deep power saving state, and wherein the chipset comprises:
    a first multiplexer for selectively outputting either a state signal of the graphics data buffer or an SB control signal output from a south bridge according to the state signal;
    a second multiplexer for selectively outputting either what the first multiplexer outputs or an NB−1 control signal according to a counting control signal of a down counter; and
    a flip-flop having an input end coupled to an output end of the second multiplexer for outputting the NB control signal based on a control clock, the NB control signal traveling to an input end of the second multiplexer to become the NB−1 control signal.

12. The method of claim 11, wherein the NB control signal is a non-snoop signal.

13. The method of claim 11, wherein the CPU in the deep power saving state does not support a snoop operation.

* * * * *